US010367567B2

(12) United States Patent
Dietrich

(10) Patent No.: US 10,367,567 B2
(45) Date of Patent: *Jul. 30, 2019

(54) METHOD, APPARATUS AND COMMUNICATION UNIT

(71) Applicant: Intel Deutschland GmbH, Neubiberg (DE)

(72) Inventor: Frank Dietrich, Fuerstenfeldbruck (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,974

(22) Filed: Jan. 5, 2018

(65) Prior Publication Data
US 2018/0131432 A1    May 10, 2018

Related U.S. Application Data

(63) Continuation of application No. 15/196,894, filed on Jun. 29, 2016, now Pat. No. 9,900,077, which is a
(Continued)

(51) Int. Cl.
*H04B 1/02*          (2006.01)
*H04B 7/06*          (2006.01)
(Continued)

(52) U.S. Cl.
CPC ......... *H04B 7/0634* (2013.01); *H04B 7/0456* (2013.01); *H04B 7/0486* (2013.01);
(Continued)

(58) Field of Classification Search
CPC .. H04B 7/0617; H04B 7/0486; H04B 7/0417; H04B 7/0478; H04B 7/0634;
(Continued)

(56) References Cited

U.S. PATENT DOCUMENTS 7,629,902 B2    12/2009  Zhang et al.
7,764,931 B2 *   7/2010  Kim ..................... H04B 7/0417
                                                370/295
(Continued)

OTHER PUBLICATIONS

"Ergodic Capacity of MIMO Channels with Statistical Channel State Information at the Transmitter"; Mario Kiessling, Joachim Speidel and Markus Reinhardt; Smart Antennas; Mar. 2004; pp. 79-86.
(Continued)

*Primary Examiner* — Nhan T Le
(74) *Attorney, Agent, or Firm* — Schwabe, Williamson & Wyatt, P.C.

(57) ABSTRACT

A method, an apparatus and a communication unit for generating precoding feedback information in a multiple frequency radio transmission system are disclosed. A rank for precoding matrices, wherein the rank is constant over the multiple frequencies, is selected and a plurality of precoding matrices having the selected rank are selected. A different precoding matrix is selected for each frequency subset of the multiple frequencies.

25 Claims, 3 Drawing Sheets

Related U.S. Application Data continuation of application No. 14/717,648, filed on May 20, 2015, now Pat. No. 9,413,446, which is a continuation of application No. 14/284,683, filed on May 22, 2014, now Pat. No. 9,065,719, which is a continuation of application No. 13/478,447, filed on May 23, 2012, now Pat. No. 8,761,692, which is a continuation of application No. 12/194,640, filed on Aug. 20, 2008, now Pat. No. 8,204,453.

(51) Int. Cl.
*H04L 27/26* (2006.01)
*H04L 27/28* (2006.01)
*H04B 7/0456* (2017.01)

(52) U.S. Cl.
CPC ........... *H04B 7/068* (2013.01); *H04B 7/0617* (2013.01); *H04B 7/0639* (2013.01); *H04L 27/2626* (2013.01); *H04L 27/28* (2013.01)

(58) Field of Classification Search
CPC .... H04B 17/24; H04B 7/0669; H04B 7/0671; H04L 1/0003; H04L 1/0009
See application file for complete search history.

(56) References Cited

U.S. PATENT DOCUMENTS

| | | | |
|---|---|---|---|
| 7,885,348 B2 | 2/2011 | Li et al. | |
| 8,165,075 B2* | 4/2012 | Han | H04B 7/0413 370/329 |
| 8,179,775 B2 | 5/2012 | Chen et al. | |
| 8,184,732 B2 | 5/2012 | Zheng et al. | |
| 8,204,453 B2 | 6/2012 | Dietrich | |
| 8,229,017 B1 | 7/2012 | Lee et al. | |
| 8,315,204 B2 | 11/2012 | Zhu et al. | |
| 8,483,085 B2 | 7/2013 | Pan et al. | |
| 8,554,147 B2 | 10/2013 | Dietrich | |
| 8,699,602 B2* | 4/2014 | Chen | H04L 1/0026 370/208 |
| 8,761,692 B2 | 6/2014 | Dietrich | |
| 9,065,719 B2* | 6/2015 | Dietrich | H04B 7/0617 |
| 9,413,446 B2* | 8/2016 | Dietrich | H04B 7/0617 |
| 9,716,604 B2* | 7/2017 | Pan | H04B 7/0417 |
| 9,900,077 B2* | 2/2018 | Dietrich | H04B 7/0617 |
| 2007/0263746 A1 | 11/2007 | Son | |
| 2007/0280373 A1 | 12/2007 | Lee et al. | |
| 2008/0013610 A1 | 1/2008 | Varadarajan et al. | |
| 2008/0043865 A1 | 2/2008 | Kim et al. | |
| 2008/0069281 A1 | 3/2008 | Olesen et al. | |
| 2008/0080459 A1 | 4/2008 | Kotecha et al. | |
| 2008/0080545 A1 | 4/2008 | Wong et al. | |
| 2008/0080637 A1 | 4/2008 | Khan et al. | |
| 2008/0187030 A1 | 8/2008 | Khan | |
| 2008/0260059 A1 | 10/2008 | Pan | |
| 2008/0287075 A1 | 11/2008 | Kim et al. | |
| 2009/0017769 A1 | 1/2009 | Chen et al. | |
| 2009/0080549 A1 | 3/2009 | Khan et al. | |
| 2010/0002801 A1 | 1/2010 | Jia et al. | |

OTHER PUBLICATIONS

3GPP TS 36.211, V1.3.0 12 (2007-0809); 3rd Generation Partnership Project; Technical Specification Group Radio Access Network; Evolved Universal Terrestrial Radio Access (E-UTRA); Physical Channels and Modulation; 55 pages.

"Limited Feedback Unitary Precoding for Spatial Multiplexing Systems"; David J. Love and Robert W. Heath; IEEE Transactions on Information Theory; vol. 51, No. 8; Aug. 2005; pp. 2967-2976.

"MIMO Wireless Linear Precoding"; Mai Vu and Arogyaswami Paulraj; Accepted to IEEE Signal Processing Magazine; Submitted Feb. 2006; revised Nov. 2006 and Dec. 2006; 39 pages.

German Patent Office; Office Action for German App. No. 102009033595.1 dated Aug. 28, 2014; 15 pages inclusive of English translation.

Office Action dated Mar. 22, 2017 from U.S. Appl. No. 15/196,894, 8 pages.

3GPP, "Technical Specification Group Radio Access Network; Evolved Universal Terrestrial Radio Access (E-UTRA); Physical layer procedures (Release 8)," 3GPP TS 36.213 V8.3.0 (May 2008), 45 pages.

* cited by examiner

METHOD, APPARATUS AND COMMUNICATION UNIT

CROSS REFERENCE TO RELATED APPLICATIONS

The present application is a continuation of U.S. patent application Ser. No. 15/196,894, filed Jun. 29, 2016, entitled "METHOD, APPARATUS AND COMMUNICATION UNIT," which is a continuation of U.S. patent application Ser. No. 14/717,648, filed May 20, 2015, entitled "METHOD, APPARATUS AND COMMUNICATION UNIT," which is a continuation of U.S. patent application Ser. No. 14/284,683, filed May 22, 2014, entitled "METHOD, APPARATUS AND COMMUNICATION UNIT," now U.S. Pat. No. 9,065,719, issued Jun. 23, 2015, which is a continuation of U.S. patent application Ser. No. 13/478,447, filed May 23, 2012, entitled "METHOD, APPARATUS AND COMMUNICATION UNIT," now U.S. Pat. No. 8,761,692, issued on Jun. 24, 2014, which is a continuation of U.S. patent application Ser. No. 12/194,640, filed Aug. 20, 2008, entitled "METHOD, APPARATUS AND COMMUNICATION UNIT," now U.S. Pat. No. 8,204,453, issued Jun. 19, 2012. The entire disclosures of which are hereby incorporated by reference in their entireties for all purposes, except for those sections, if any, that are inconsistent with this specification.

FIELD

This invention relates to methods for generating feedback information in radio transmission systems, devices for generating feedback information in radio transmission systems and communication units in radio transmission systems.

BACKGROUND

Multiple-input multiple-output (MIMO) communication systems use multiple data streams. Precoding can be provided to manipulate multiple data streams in MIMO communication systems by applying precoding matrices to the data streams.

DETAILED DESCRIPTION

Figure 1:
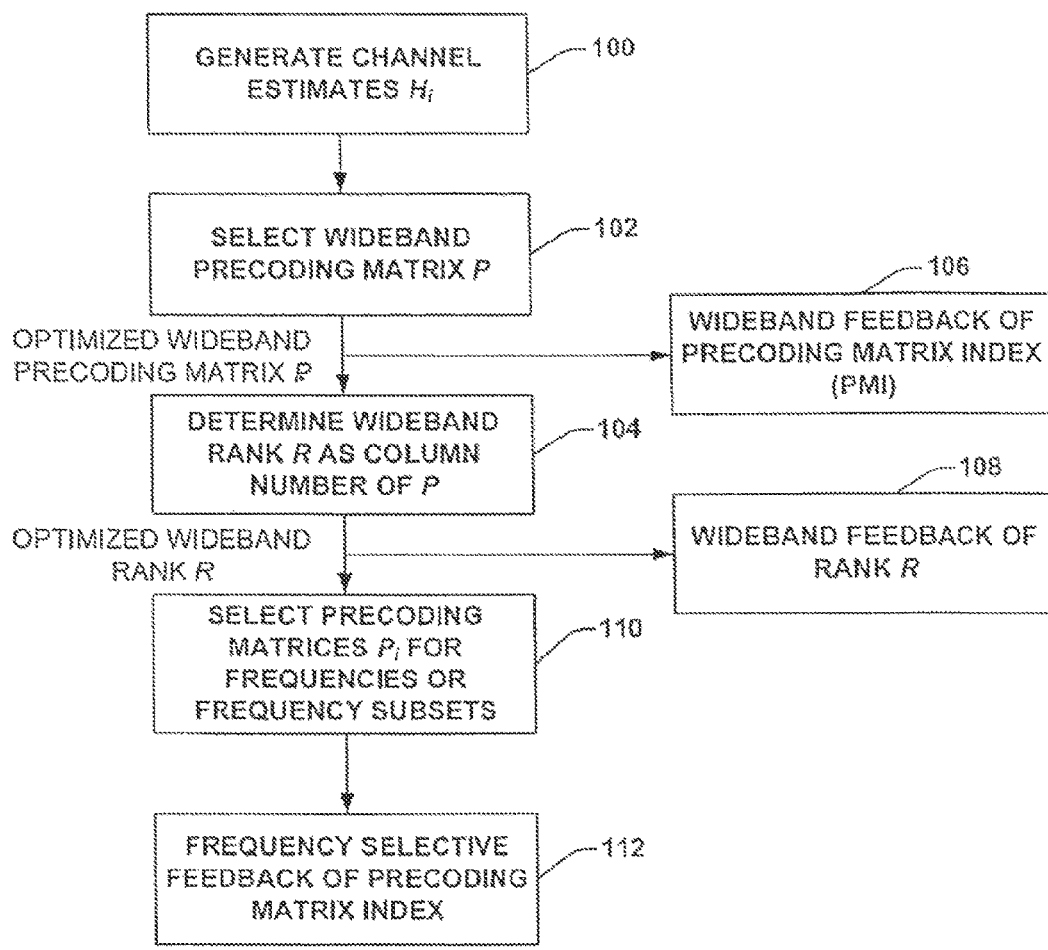
FIG. 1 schematically illustrates a method according to one exemplary embodiment.

The following embodiments of the invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the embodiments of the invention. The following description is therefore not to be taken in a limiting sense, and the scope of the invention is defined by the appended claims.

Methods and apparatuses as described herein may be utilized for radio transmission systems, in particular Multiple Input Multiple Output (MIMO) systems operating in Orthogonal Frequency Division Multiplex (OFDM) mode in one embodiment. The apparatuses disclosed may be embodied in baseband segments of devices used for reception of radio signals, such as mobile phones, handheld devices and/or mobile radio receivers or in mobile radio base stations, in particular radio transmitters. The described apparatuses may be employed to perform methods as disclosed herein, although those methods may be performed in any other way as well, in particular outside baseband chips of mobile radio receivers and/or mobile phones.

A radio transmission link, in particular an OFDM communication link may be operable with an amount of N subcarriers, with N being an integer equal to or greater than 1. Subcarriers of such radio transmission systems may comprise a single frequency each. They may also comprise a plurality of frequencies, for example adjoining frequencies in a frequency range or any arbitrary subset of frequencies. In one embodiment, the number of frequencies included in a subcarrier may not be limited to any number of frequencies. For transmission of radio signals, such as OFDM radio signals, NT transmit antennas may be used, for example in transmission diversity mode, to transmit the signals in NS modulated data streams di, wherein i ranges from 1 to N. The radio signals may be received by NR receive antennas. Using this transmission method, up to NS=min(NT,NR) modulated data streams di may be transmitted simultaneously, i.e. multiplexed in space.

In one embodiment, the data streams di may have been modulated in the transmission device, for example a mobile radio base station, using modulation techniques commonly known to one in the art. The modulated data streams di may be precoded using a precoding matrix Pi having NT lines and NS columns and then be transmitted using the NT transmit antennas. The precoding matrices Pi may have complex values. In particular, the precoding matrices Pi may be chosen to originate from the codebook C defined in the 3GPP-LTE standard. The codebook C contains precoding matrices P which satisfy the transmit power constraint:

$$\|P\|^2_F = P_T. \tag{1}$$

The modulated and precoded data streams $P_i d_i$ may then be transmitted over transmission channels having channel transmission characteristics $H_i$. The channel transmission characteristics may be estimated in the transmitter and/or the receiver. According to the channel transmission characteristics $H_i$ the precoding matrices $P_i$ may be selected adaptively. Additionally the modulated, precoded and channel-modulated data streams $H_i P_i d_i$ may be distorted by additive spatially white Gaussian noise $n_i$. The Gaussian noise may in particular be dependent on the signal-to-noise ratio of the transmitted data streams. A receive signal $y_i$ at $N_R$ antennas on subcarrier i may be:

$$y_i = H_i P_i d_i + n_i. \tag{2}$$

Precoding matrices $P_i$ may be selected dependent on the channel characteristics $H_i$. In particular, precoding matrices $P_i$ may be selected such that the data capacity of a MIMO communication link employed by the transmitter is optimally used, i.e. the data rate F of the communication channel is as high as possible. The data rate F of a MIMO communication link may be expressed as $$F(P_i; H_i) = \log_2 \det(I + H_i P_i P_i^H H_i^H \sigma_n^{-2}), \quad (3)$$

wherein the superscript H denotes the adjoint matrix, i.e. the Hermitian transpose, of the associated matrix, and $\sigma_n$ denotes the strength of the additive spatially white Gaussian noise Other choices for the function F describing the data rate may be applicable as well and such variations are contemplated as falling within the scope of the invention.

The data rate F may depend on the choice of precoding matrices $P_i$ and the channel transmission characteristics $H_i$. Different optimization techniques may be utilized to maximize the data rate F. Depending on the receiver used for reception of the receive signal, different techniques may be used to extract the data from the receive signal, for example serial interference cancellation (SIC) or minimizing the mean square error (MMSE). Therefore, the optimization of the data rate may be tailored according to the type of receiver according to various embodiments of the invention. In one embodiment, techniques which minimize the mean square error may be performed by using a linear MIMO equalizer (MMSE equalizer) in the receiver. Assuming a MMSE equalizer in the receiver, the data rate FM to be optimized may be expressed as $$F_M(P_i; H_i) = \Sigma_{k=1}^{N_S} \log_2(1 + SINR_{i,k}) = -\Sigma_{k=1}^{N_S} \log_2(\sigma_n^2 [(P_i^H H_i^H H_i P_i + \sigma_n^2 I)^{-1}]_{k,k}), \quad (4)$$

wherein I denotes the unit matrix and $SINR_{i,k}$ the signal-to-interference-and-noise ratio of the k-th data stream on subcarrier i. The optimization therefore may aim to maximize the signal-to-interference-and-noise ratio $SINR_{i,k}$ after equalization (post-equalization SINR) in one embodiment.

In one embodiment, the precoding matrices $P_i$ may be selected such that for each subcarrier a different precoding matrix $P_i$ is chosen. Additionally, for each subcarrier the rank $R_i$ of the associated precoding matrix $P_i$ may be selected independently of the ranks of the remaining subcarriers. If the radio transmission system is operating according to the LTE standard in one embodiment, the ranks $R_i$ of the precoding matrices $P_i$ are all equal to R over the whole frequency band, i.e. the rank R is selected to be constant for each of the precoding matrices $P_i$. If the rank R is selected to be constant, the precoding matrices $P_i$ may be selected from a subset of the entirety of precoding matrices $P_i$. In other words, the selection process for the precoding matrices $P_i$ is restricted to the pool of precoding matrices having the desired rank R.

In one embodiment, selecting precoding matrices $P_i$ may include solving an optimization problem. For different ranks $R_i$ over every subcarrier the optimization problem may be set to $$\max_{\{P_i \in C\}_{i=1}^N} \sum_{i=1}^N F(P_i; H_i) = \max_{\{R_i\}_{i=1}^N} \max_{\{P_i \in C_{R_i}\}_{i=1}^N} \sum_{i=1}^N F(P_i; H_i). \quad (5)$$

For a constant rank R over every subcarrier the optimization problem simplifies to $$\max_R \max_{\{P_i \in C_R\}_{i=1}^N} \sum_{i=1}^N F(P_i; H_i). \quad (6)$$

With the optimization problem given in equation (6) for every possible R, every possible combination of precoding matrices $P_i$ with the corresponding rank R has to be evaluated.

FIG. 1 shows a method according to one exemplary embodiment. First, estimates for the channel transmission characteristics may be generated at 100. The estimates for the channel transmission characteristics may be provided in one embodiment by means commonly known to ones skilled in the art. The generated estimates may be used to select a wideband precoding matrix P of 102. In other words, a precoding matrix P may be selected such that the data rate over the whole frequency band is maximized in one embodiment. In one embodiment, the precoding matrix P may be selected to optimize the expression $$\max_{P \in C} \sum_{i=1}^N F(P; H_i). \quad (7)$$

Solving this particular optimization problem may be performed by using an approximation for the sum in equation (7):

$$\Sigma_{i=1}^N F(P; H_i) \approx F_C(P^H R_{Tx} P), \quad (8)$$

wherein $R_{TX}$ is the maximum likelihood estimate of the transmit correlation matrix and $F_C(M)$ may, for example, be a cost function defined by $$F_C(M) = \log_2 \det(I + M \sigma_n^{-2}). \quad (9)$$

Other definitions for the cost function may be used as well in alternative embodiments, depending on the type of receiver receiving the receive signal. The particular cost function $F_C(M)$ as described in this embodiment may be considered for serial interference cancellation (SIC) or minimizing the mean square error (MMSE) in the receiver. $R_{Tx}$ (the maximum likelihood estimate of the transmit correlation matrix) may further be defined as $$R_{Tx} = N^{-1} \Sigma_{i=1}^N H_i^H H_i \approx E(H_i^H H), \quad (10)$$

wherein E(X) is the arithmetical mean function of the value X, i.e. the expectation value of the variable X. When selecting the wideband precoding matrix P the optimization problem to be solved may thus be $$\max_{P \in C} \log_2 \det(I + P^H R_{Tx} P \sigma_n^{-2}). \quad (11)$$

The optimization problem given in Equation (10) may describe a system with a SIC receiver. For a linear MMSE receiver, the optimization problem may become $$\min_{P \in C} \sum_{k=1}^{N_s} \log_2 \left( (I + P^H R_{Tx} P \sigma_n^{-2})^{-1}_{k,k} \right), \quad (12)$$

which may be transformed into a minimization problem of the geometric mean of minimum MSEs $$\min_{P \in C} \prod_{k=1}^{N_s} \left( (I + P^H R_{Tx} P \sigma_n^{-2})^{-1}_{k,k} \right). \quad (13)$$

When the wideband precoding matrix P has been selected at 102 of FIG. 1 according to one of the optimization problems given in equations (7), (11), (12) or (13), the rank R of the wideband precoding matrix P may be selected at 104 in one embodiment as the optimized wideband rank R, which may be held constant over the whole frequency band, i.e. over all N subcarriers i. The rank R may alternatively be selected according to the mean transmit correlation matrix $R_{Tx}$ over all subcarriers i. Feedback information regarding the selected wideband precoding matrix P may be output to other components at 106 in the radio transmission system, in particular a precoding matrix index (PMI). Additionally, feedback information regarding the selected rank R may be output to other components at 108 in the radio transmission system. Feedback information regarding the precoding matrix index (PMI) of the selected wideband precoding matrix P and/or the selected rank R may be transmitted to the radio transmitter transmitting the modulated data streams $d_i$ in one embodiment.

In another step, optimization problems similar to optimization problems given in equations (7), (11), (12) and/or (13) may be solved for each subcarrier i. Precoding matrices $P_i$ may be selected at 110 from a subset of precoding matrices $P_i$ having the previously selected rank R according to the optimization problem $$\max_{\{P_i \in C_R\}_{i=1}^N} \sum_{i=1}^N F(P_i; H_i). \tag{14}$$

If the optimization problem is to be solved, when a linear MMSE equalizer is assumed in the receiver in one embodiment, the respective optimization problem may be $$\min_{\{P_i \in C_R\}_{i=1}^N} \sum_{k=1}^{N_s} \log_2((I + P_i^H R_{Tx} P_i \sigma_n^{-2})_{k,k}^{-1}). \tag{15}$$

Similarly to equation (13), the optimization problem of equation (15) may be transformed to $$\min_{\{P_i \in C_R\}_{i=1}^N} \prod_{k=1}^{N_s} ((I + P^H R_{Tx} P \sigma_n^{-2})_{k,k}^{-1}). \tag{16}$$

In equations (14) to (16), the subset CR of precoding matrices $P_i$ only contains precoding matrices Pi with the selected rank R. The precoding matrices $P_i$ for each subcarrier i may be selected depending on the mean transmit correlation matrix over the frequencies in the associated subcarrier i. Feedback information on the plurality of selected precoding matrices $P_i$ may be output to other components of the radio transmission system at 112, in particular to the transmitter, i.e. the base station of the radio transmission system. Feedback on the plurality of selected precoding matrices $P_i$ may include precoding matrix indices (PMI) of at least one of the plurality of precoding matrices $P_i$.

Figure 2:
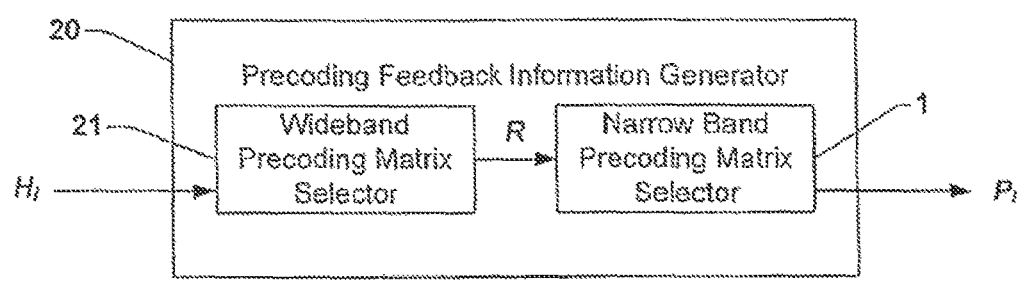
FIG. 2 schematically illustrates a device 20 according to one exemplary embodiment.

In FIG. 2 an apparatus 20 according to one exemplary embodiment is shown. The apparatus 20 may be a precoding feedback information generator configured to generate precoding feedback information in a radio transmission system such as a MIMO communication system operable in an OFDM mode. The apparatus 20 may include a wideband precoding matrix selector 21 and a narrow band precoding matrix selector 1. The wideband precoding matrix selector 21 may be fed with estimates of the channel transmission characteristics $H_i$ and may output a selected wideband precoding matrix P having a selected rank R to the narrow band precoding matrix selector 1. The narrow band precoding matrix selector 1 may be configured to output a plurality of narrow band precoding matrices $P_i$ for each subcarrier i of the radio transmission system and to output feedback information on the plurality of narrow band precoding matrices $P_i$ for each subcarrier i, in particular precoding matrix indices (PMI). The apparatus 20 may be configured to perform a method as illustrated in FIG. 1 in one embodiment.

Figure 3:
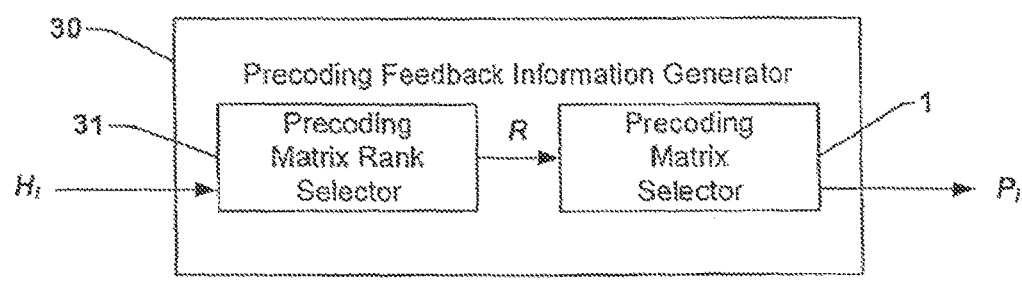
FIG. 3 schematically illustrates a device 30 according to one exemplary embodiment.

In FIG. 3 an apparatus 30 according to one exemplary embodiment is shown. The apparatus 30 may be a precoding feedback information generator configured to generate precoding feedback information in a radio transmission system such as a MIMO communication system operable in an OFDM mode. The apparatus 30 may include a precoding matrix rank selector 31 and a precoding matrix selector 1. The precoding matrix rank selector 31 may be fed with estimates of the channel transmission characteristics and may output a selected rank for a precoding matrix P to the precoding matrix selector 1. The precoding matrix selector 1 may be configured to output a plurality of precoding matrices $P_i$ having the selected rank R output by the precoding matrix rank selector 31 for each subcarrier i of the radio transmission system, and further configured to output feedback information on the plurality of narrow band precoding matrices Pi for each subcarrier i, such as precoding matrix indices (PMI) in one embodiment. The apparatus 30 may in particular be configured to perform a method as illustrated in FIG. 1.

Figure 4:
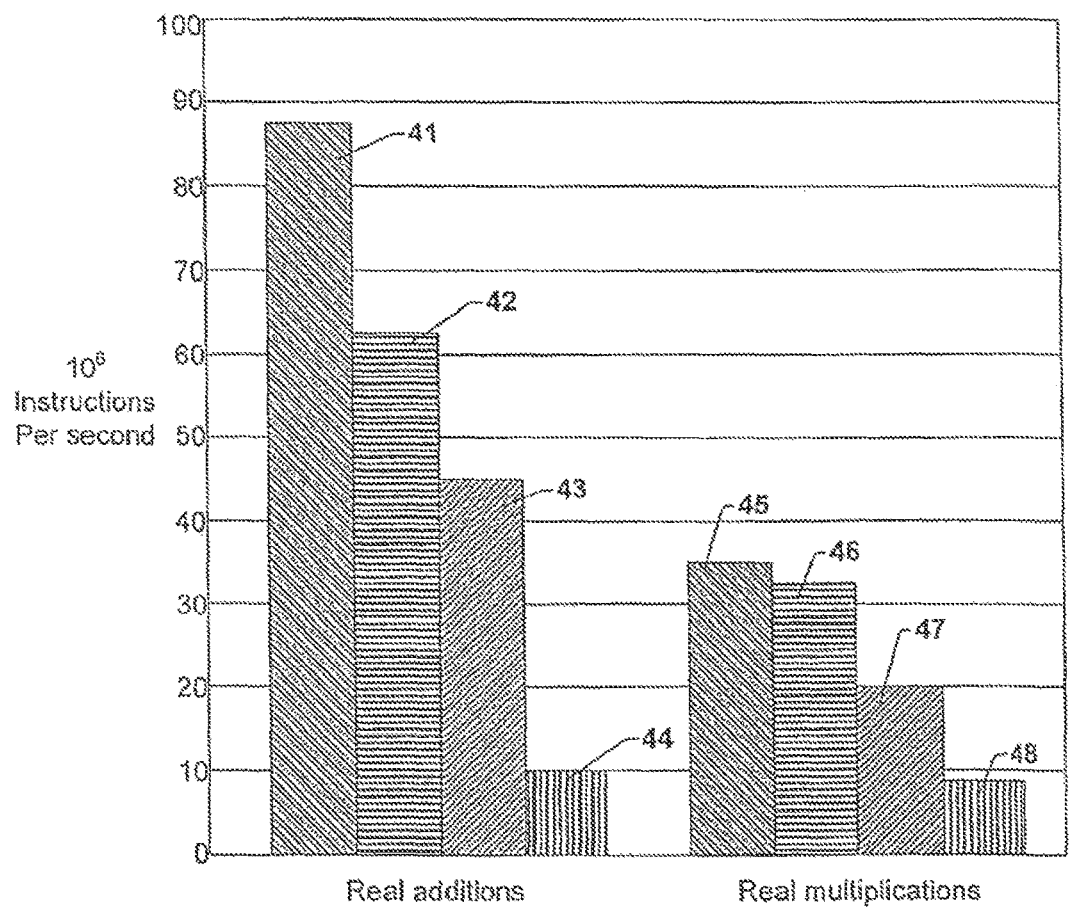
FIG. 4 is a graph illustrating a pillar diagram.

In FIG. 4 a graph illustrating a pillar diagram is shown. As an example, an LTE system with a 2×4 MIMO link having four transmit antennas and two receive antennas, i.e. $N_T=4$, $N_R=2$, and 1200 subcarriers divided in sub-bands of 48 subcarriers each is contemplated. The precoding matrices have been selected from the precoding codebook C with a minimum feedback period of 1 ms.

Pillars 41 to 48 represent the amounts of real value operations in million instructions per second for different real value operations in different computational methods. Pillars 41 to 44 show the amounts of real value additions in different computational methods. Pillar 41 represents the number of real value additions, when evaluating precoding matrices Pi for each sub-band of subcarriers according to equation (4) using a linear MMSE equalizer without evaluating a wideband precoding matrix P having a constant rank R before. The associated optimization problem to be solved is given in equation (6). Pillars 42 and 43 each represent the number of real value additions when solving an optimization problem as given in equation (15), where narrow band precoding matrices Pi are selected, wherein pillar 42 represents the worst assumable case and pillar 43 represents the best assumable case. Both pillar 42 and pillar 43 show a considerably lower number of real value additions than pillar 41, since for the optimization problem of equation (15) a considerably lower amount of function evaluations is necessary than for the optimization problem of equation (6). Pillar 44 represents the number of real value additions when solving an optimization problem as given in equation (13), where an optimized wideband precoding matrix P over a whole frequency band is selected.

Pillars 45 to 48 represent respective numbers as pillars 41 to 44, respectively, for real value multiplications instead of real value additions. Again, the number of real value additions for pillar 45 is higher than the number of real value additions for pillars 46 and 47.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

The invention claimed is:

1. An apparatus comprising:
   means for determining a rank for a set of sub-bands;
   means for outputting first feedback information regarding the rank;
   means for selecting a sub-band precoding matrix for a sub-band that is selected from the set of sub-bands;
   means for outputting a sub-band precoding matrix index ("PMI") regarding the sub-band precoding matrix based on the rank that is determined for the set of the sub-bands; and
   means for receiving a data stream transmitted based on the sub-band precoding matrix.

2. The apparatus of claim 1, wherein the sub-band precoding matrix is selected according to 3GPP-LTE standard.

3. The apparatus of claim 1, wherein the means for selecting the sub-band precoding matrix selects the sub-band precoding matrix from a precoding codebook for the selected sub-band.

4. The apparatus of claim 1, wherein the rank is constant over the set of the sub-bands.

5. The apparatus of claim 1, wherein means for selecting the sub-band precoding matrix comprises selecting the sub-band precoding matrix to maximize a data rate of the data stream.

6. The apparatus of claim 1, further comprising:
   means for selecting a wideband precoding matrix for the set of sub-bands from a precoding codebook for the set of sub-bands.

7. The apparatus of claim 6, wherein the means for selecting the wideband precoding matrix is to select the wideband precoding matrix based on a maximum likelihood estimate of a transmit correlation matrix.

8. The apparatus of claim 6, further comprising:
   means for outputting a wideband precoding matrix index of the selected wideband precoding matrix.

9. The apparatus of claim 6, wherein the wideband precoding matrix is constant over the set of sub-bands.

10. An apparatus, comprising:
    means for outputting a feedback for a rank over a set of sub-bands;
    means for outputting a wideband precoding matrix index for a wideband precoding matrix from a codebook for the set of sub-bands based on the rank of the set of sub-bands;
    means for outputting a sub-band precoding matrix index for a sub-band precoding matrix from the codebook for a sub-band from the set of the sub-bands, and wherein the sub-band precoding matrix index is generated based on the rank of the set of sub-bands; and
    means for receiving a data stream to be transmitted based on the sub-band precoding matrix.

11. The apparatus of claim 10, wherein the wideband precoding matrix is constant over the set of sub-bands.

12. The apparatus of claim 10, wherein the apparatus is in a baseband chip of a mobile phone, a handheld device, or a base station.

13. The apparatus of claim 10, further comprising: means for selecting the wideband precoding matrix to maximize a data rate in transmission.

14. An apparatus comprising:
    means for providing a rank corresponding to a set of sub-bands and a feedback on the rank;
    means for providing a wideband precoding matrix index of a wideband precoding matrix corresponding to the set of sub-bands and the rank of the set of sub-bands, wherein the wideband precoding matrix is based on a maximum likelihood estimate of a transmit correlation matrix; and
    means for providing a sub-band precoding matrix index of a sub-band precoding matrix for a sub-band from the set of the sub-bands, and wherein the sub-band precoding matrix is generated corresponding to the rank of the set of sub-bands.

15. The apparatus of claim 14, wherein the sub-band precoding matrix is used to precode a transmission signal.

16. The apparatus of claim 15, further comprising:
    means for receiving the transmission signal precoded by the sub-band precoding matrix.

17. An apparatus comprising:
    means for selecting a wideband precoding matrix over a set of sub-bands;
    means for determining a rank of the wideband precoding matrix;
    means for generating a rank feedback for the rank, wherein the rank feedback corresponds to the set of sub-bands;
    means for selecting a sub-band precoding matrix for a sub-band that is selected from the set of the sub-bands; and
    means for generating a sub-band precoding matrix index ("PMI") of the sub-band precoding matrix, wherein the sub-band precoding matrix is generated based on the rank of the wideband precoding matrix.

18. An apparatus comprising:
    means for selecting a wideband precoding matrix for a set of sub-bands;
    means for generating first feedback information to provide an indication of the wideband precoding matrix, the first feedback information to be fed back to a second device;
    means for selecting a sub-band precoding matrix for a sub-band of the set of sub-bands;

means for generating second feedback information to provide an indication of the sub-band precoding matrix, the second feedback information to be fed back to the second device; and means for receiving a modulated data stream transmitted by the second device, wherein the modulated data stream is transmitted based on the wideband precoding matrix or the sub-band precoding matrix.

19. The apparatus of claim 18, further comprising:
means for selecting a rank for the set of sub-bands; and
means for generating third feedback information to provide an indication of the selected rank.

20. The apparatus of claim 19, wherein the means for selecting the sub-band pre-coding matrix is to select the sub-band pre-coding matrix for the rank.

21. The apparatus of claim 18, wherein the sub-band pre-coding matrix is a first sub-band pre-coding matrix, the sub-band is a first sub-band, and the apparatus further comprises:
means for selecting a second sub-band pre-coding matrix for a second sub-band of the set of sub-bands; and means for generating third feedback information to provide an indication of the second sub-band pre-coding matrix.

22. The apparatus of claim 18, wherein the sub-band precoding matrix is selected according to 3GPP-LTE standard.

23. The apparatus of claim 18, wherein means for selecting the sub-band precoding matrix are to select the sub-band precoding matrix from a precoding codebook for the sub-band.

24. The apparatus of claim 18, wherein the means for selecting the wideband precoding matrix are to select the wideband precoding matrix based on a maximum likelihood estimate of a transmit correlation matrix.

25. The apparatus of claim 18, wherein the first feedback information includes an indication of a first pre-coding matrix index that corresponds to the wideband pre-coding matrix and the second feedback information includes an indication of a second pre-coding matrix index that corresponds to the sub-band pre-coding matrix.

* * * * *